(12) United States Patent
Arai

(10) Patent No.: US 10,538,246 B2
(45) Date of Patent: Jan. 21, 2020

(54) DRIVE TORQUE CONTROL DEVICE, DRIVE SOURCE UNIT AND VEHICLE

(71) Applicant: YAMAHA HATSUDOKI KABUSHIKI KAISHA, Iwata-shi, Shizuoka (JP)

(72) Inventor: Katsuhiro Arai, Iwata (JP)

(73) Assignee: YAMAHA HATSUDOKI KABUSHIKI KAISHA, Iwata-Shi, Shizuoka (*) Notice: Subject to any disclaimer, the term of this patent is extended or adjusted under 35 U.S.C. 154(b) by 182 days.

(21) Appl. No.: 15/680,951

(22) Filed: Aug. 18, 2017

(65) Prior Publication Data

US 2017/0341650 A1 Nov. 30, 2017

Related U.S. Application Data

(63) Continuation of application No. PCT/JP2016/055243, filed on Feb. 23, 2016.

(30) Foreign Application Priority Data

Feb. 26, 2015 (JP) ................................. 2015-037182

(51) Int. Cl.
*B60W 30/18* (2012.01)
*B60W 10/06* (2006.01)
(Continued)

(52) U.S. Cl.
CPC ...... *B60W 30/18027* (2013.01); *B60W 10/06* (2013.01); *B60W 10/184* (2013.01);
(Continued)

(58) Field of Classification Search
CPC .............................................. B60W 30/18027
See application file for complete search history.

(56) References Cited

U.S. PATENT DOCUMENTS 5,564,796 A 10/1996 Saito et al.
6,125,314 A 9/2000 Graf et al.
(Continued)

FOREIGN PATENT DOCUMENTS

DE 19654769 A1 7/1998
EP 2138367 A2 12/2009
(Continued)

*Primary Examiner* — Hussein Elchanti
*Assistant Examiner* — Michael A Berns
(74) *Attorney, Agent, or Firm* — Rabin & Berdo, P.C.

(57) ABSTRACT

A drive torque control device of a vehicle that includes a drive source for generating a drive source torque, a brake mechanism for generating a braking torque, and a drive wheel for driving the vehicle. The drive torque control device includes a target drive wheel torque calculator configured to calculate a target drive wheel torque, a drive source torque control unit configured to estimate a drive source torque limit value, calculate a target drive source torque based on the target drive wheel torque and the drive source torque limit value, and control the generation of the drive source torque by the drive source based on the target drive source torque, and a braking torque control unit configured to calculate a target braking torque based on the target drive wheel torque and the target drive source torque, and control the generation of the braking torque by the brake mechanism based on the target braking torque.

12 Claims, 7 Drawing Sheets

(51) Int. Cl.
*B60W 10/184* (2012.01)
*F02D 41/00* (2006.01)
*F02M 35/02* (2006.01)

(52) U.S. Cl.
CPC ..... *F02D 41/0002* (2013.01); *B60W 2300/36* (2013.01); *B60W 2510/0638* (2013.01); *B60W 2710/0605* (2013.01); *B60W 2710/18* (2013.01); *F02M 35/02* (2013.01)

(56) References Cited

U.S. PATENT DOCUMENTS

| | | | |
|---|---|---|---|
| 6,182,003 B1 * | 1/2001 | Maier-Landgrebe | ............... B60K 28/16 180/197 |
| 8,205,510 B2 * | 6/2012 | DiLuigi | ............ G01L 3/1407 73/862.21 |
| 2005/0012386 A1 | 1/2005 | Nakano et al. | |
| 2009/0048751 A1 | 2/2009 | Nakai et al. | |

FOREIGN PATENT DOCUMENTS

| | | |
|---|---|---|
| EP | 2374673 A1 | 10/2011 |
| JP | H07-228237 A | 8/1995 |
| JP | 2002-188479 A | 7/2002 |
| JP | 2003-214260 A | 7/2003 |
| JP | 2004-230946 A | 8/2004 |
| JP | 2005-035344 A | 2/2005 |
| JP | 2007-107414 A | 4/2007 |
| JP | 2009-040307 A | 2/2009 |

* cited by examiner

DRIVE TORQUE CONTROL DEVICE, DRIVE SOURCE UNIT AND VEHICLE

CROSS REFERENCE TO RELATED APPLICATIONS

This is a continuation application of International Application PCT/JP2016/055243, filed on Feb. 23, 2016, which claims priority from a Japanese Patent Application No. 2015-037182, filed on Feb. 26, 2015, the contents of which are incorporated herein by reference.

BACKGROUND OF THE INVENTION

Field Of The Invention

The present invention relates to a drive torque control device which can be applied to a vehicle, a drive source unit and a vehicle.

Description Of Related Art

To suppress the slip of a drive wheel of a vehicle on a road surface, there have been proposed vehicle traction control devices including a brake traction control unit for performing a brake traction control on a brake device and an engine traction control unit for performing an engine traction control on an engine by controlling a throttle device of the engine (for example, refer to Patent Literature JP-A-7-228237).

A traction control disclosed by JP-A-7-228237 includes the following control steps. When the traction control is started by starting the engine, firstly, an operation of detecting an amount of slip is executed. Next, an operation of setting a target amount of slip is executed. Thereafter, a slip determining operation is executed. Further, an operation of calculating a target amount of control for throttle control and an operation of calculating a target amount of control for brake control are executed. Then, a throttle controlling control signal is outputted to an engine control unit, and a brake controlling control signal is outputted.

In addition, a throttle controlling target slip amount base value and a brake controlling target slip amount base value are stored in advance in a map. The throttle controlling target slip amount base value is set to be smaller than the brake controlling target slip amount base value. This is because slip is controlled by performing the engine traction control in such a state that the amount of slip is small, whereas in such a state that the amount of slip is great, slip is controlled by performing the engine traction control and the brake traction control, whereby the increase in load of the brake devices is prevented.

BRIEF SUMMARY OF THE INVENTION

Problem that the Invention is to Solve

In recent years, there have been high demands for improvement in fuel economy. Due to this, even in drive torque controls such as traction controls, the enhancement in energy efficiency has been desired. In addition, in drive torque controls such as traction controls, it has been desired to perform a highly responsive and smooth traction control in response to a change in behavior of a vehicle.

The invention provides a drive torque control device which can realize a highly responsive and smooth drive torque control in response to a change in behavior of a vehicle while enhancing the energy efficiency. Further, the invention provides a drive source unit including the drive torque control device and a vehicle including the drive source unit.

Means for Solving the Problem

The inventor of this patent application has considered that the energy efficiency of a vehicle is improved by a system for controlling the torque of a drive wheel. In generating braking torque, a brake mechanism converts the energy of motion or kinetic energy into thermal energy which is wasted. In contrast with this, a drive source consumes energy to generate drive source torque. Due to this, the energy efficiency of a vehicle can be improved by controlling appropriately the drive source torque in accordance with a target drive wheel torque of the vehicle. Thus, the inventor of this patent application has considered that the drive source torque should be made use of positively.

However, there is a problem that a change in drive wheel torque which is generated by controlling drive source torque is inferior in response to a change in drive wheel torque which is generated by controlling braking torque. In addition, there have been situations where it is difficult to control the drive source torque so as to realize the target drive wheel torque. To cope with this, a drive torque control device of the invention has the following configurations.

According to the invention, there is provided a drive torque control device comprising:

a target drive wheel torque calculator configured to calculate a target drive wheel torque of a drive wheel of a vehicle;

a drive source torque control unit configured to control drive source torque which is generated by driving force of a drive source and transmitted to the drive wheel; and a braking torque control unit configured to control at least braking toque which is generated by a brake mechanism for the drive wheel, wherein the drive source torque control unit:

estimates at least one of a maximum value and a minimum value of the drive source torque which can be generated in a predetermined period of time from now as a drive source torque limit value;

calculates a target drive source torque which is a target value of the drive source torque which is to be generated in a predetermined period of time from now based on the target drive wheel torque and the drive source torque limit value; and controls the drive source torque based on the target drive source torque, wherein the braking torque control unit:

calculates a target braking torque which is a target value of the braking torque which is to be generated in a predetermined period of time from now; based on the target drive wheel torque and the target drive source torque, and controls the braking torque based on the target braking torque.

According to the configuration described above, a target drive source torque which is a target value of the drive source torque which will be generated in a predetermined period of time from now is calculated, so that the drive source torque is controlled based on the target drive source torque. In addition, a target braking torque which is a target value of the braking torque which will be generated in a predetermined period of time from now is calculated, so that the braking torque is controlled based on the target braking torque. Thus, the energy efficiency of the drive torque control device can be enhanced by making use of the drive source torque, and by making use of the braking torque, it is possible to perform a highly responsive and smooth drive torque control in response to a change in behavior of the vehicle. Consequently, it is possible to provide the drive torque control device which can realize the highly responsive and smooth drive torque control (for example, a traction control or the like) in response to a change in behavior of the vehicle, while enhancing the energy efficiency of the drive torque control device.

The braking torque control unit may estimate at least one of a maximum value and a minimum value of the braking torque which can be generated in a predetermined period of time from now as a braking torque limit value, and calculate the target braking torque based on the target drive wheel torque, the target drive source torque and the braking torque limit value.

According to the configuration described above, a target braking torque is calculated based on the target drive wheel torque, the target drive source torque and the braking torque limit value. In this way, since the target braking torque is set so as not to exceed the braking torque limit value, it is possible to realize the highly responsive and smooth drive torque control in response to a change in behavior of the vehicle, while enhancing the energy efficiency of the drive torque control device.

The drive source torque control unit may comprise:

a drive source torque controller configured to control the drive source torque based on the target drive source torque and to estimate the drive source torque limit value; and a target drive source torque calculator configured to calculate the target drive source torque based on the target drive wheel torque and the drive source torque limit value.

The braking torque control unit may comprise:

a braking torque controller configured to control the braking torque based on the target braking torque and to estimate the braking torque limit value; and a target braking torque calculator configured to calculate the target braking torque based on the target drive wheel torque, the target drive source torque and the braking torque limit value.

According to the configuration described above, by making use of both the drive source torque and the braking torque, it is possible to realize the highly responsive and smooth drive torque control in response to a change in behavior of the vehicle, while enhancing the energy efficiency of the drive torque control device.

When a value obtained by subtracting the target drive wheel torque from the target drive source torque is equal to or smaller than a predetermined value, the braking torque control unit may set the target braking torque to zero.

According to the configuration described above, when a value obtained by subtracting the target drive wheel torque from the target drive source torque is equal to or smaller than a predetermined value, the target braking torque becomes zero. Thus, it is possible to enhance higher the energy efficiency of the drive torque control device.

The target braking torque calculator may calculate the target braking torque, based on an amount of operation of a brake operating device provided on the vehicle, the target drive wheel torque and the target drive source torque.

According to the configuration described above, since the target braking torque is set in consideration of the amount of operation of the brake operating device, it is possible to realize a smooth drive torque control which takes the amount of operation of the brake operating device which is operated by the rider into consideration.

The target braking torque calculator may set the target braking torque such that the target braking torque which is calculated based on an amount of operation of the brake operating device, the target drive wheel torque and the target drive source torque is smaller than a total value of a target braking torque which is calculated based on the target drive wheel torque and the target drive source torque and a required braking torque which corresponds to an amount of operation of the brake operating device.

According to the configuration described above, the target braking torque which is calculated based on an amount of operation of the brake operating device, the target braking torque is set such that the target drive wheel torque and the target drive source torque becomes smaller than a total value of a target braking torque which is calculated based on the target drive wheel torque and the target drive source torque and a required braking torque which corresponds to an amount of operation of the brake operating device. In this way, it is possible to realize a smooth drive torque control which takes the amount of operation of the brake operating device which is operated by the rider into consideration. In other words, it is possible to prevent the rider from having a feeling of strangeness by giving priority to the amount of operation of the brake operating device.

the drive source torque controller may determine the drive source torque limit value based on a revolution speed of the drive source and a throttle opening, and output the drive source torque limit to the target drive source torque calculator.

According to the configuration described above, since the drive source torque limit value is calculated based on a revolution speed of the drive source and a throttle opening, it is possible to a drive torque control which takes the revolution speed of the drive source and the throttle opening into consideration.

According to the invention, there is provided a drive source unit.

The drive source unit comprises:

the drive torque control device according to any one of claims 1 to 7;

the drive source configured to generate the drive source torque;

an air inlet passage configured to supply air to the drive source;

a throttle valve disposed in the air inlet passage and configured to change a cross-sectional area of the air inlet passage; and an air cleaner configured to allow the passage of air which is to be supplied into the air inlet passage.

According to the configuration described above, it is possible to realize the drive source unit which can realize a highly responsive and smooth drive control (for example, a traction control or the like) in response to a change in behavior of a vehicle while enhancing the energy efficiency of the drive source unit by making use of both the drive source torque and the braking torque.

The drive source unit may include further:

a throttle valve drive unit configured to change a cross-sectional area of the air inlet passage by driving the throttle valve, wherein the drive source torque control unit is configured to control the driving of the throttle valve drive unit.

According to the configuration described above, the drive source torque control unit can control the drive source torque by driving and controlling the throttle valve.

The throttle valve may be disposed in a position which is closer to an end portion of the air inlet passage which is connected to the drive source than an end portion of the air inlet passage which is connected to the air cleaner.

According to the configuration described above, since the throttle valve is disposed in the position which is closer to the end portion of the air inlet passage which is connected to the drive source than the end portion of the air inlet passage which is connected to the air cleaner, it is possible to realize a highly responsive drive source torque control.

According to the invention, there is provided a vehicle comprising:

the drive torque control device;

the drive source configured to generate the drive source torque;

the drive wheel configured to rotate by the drive source torque; and the brake mechanism configured to apply braking torque to the drive wheel.

According to the configuration described above, it is possible to provide the vehicle which can realize a highly responsive and smooth drive control (for example, a traction control or the like) in response to a change in behavior of the vehicle while enhancing the energy efficiency of the vehicle by making use of both the drive source torque and the braking torque.

The vehicle includes further a riding type seat.

Since the weight of the vehicle including the riding type seat is light, it is possible to realize a highly responsive and smooth drive source control (for example, a traction control or the like) in response to a change in behavior of the vehicle while enhancing the energy efficiency of the vehicle.

DETAILED DESCRIPTION OF THE INVENTION

Hereinafter, an embodiment of the invention (hereinafter, referred to simply as the embodiment) will be described in detail by reference to the drawings.

Figure 1:
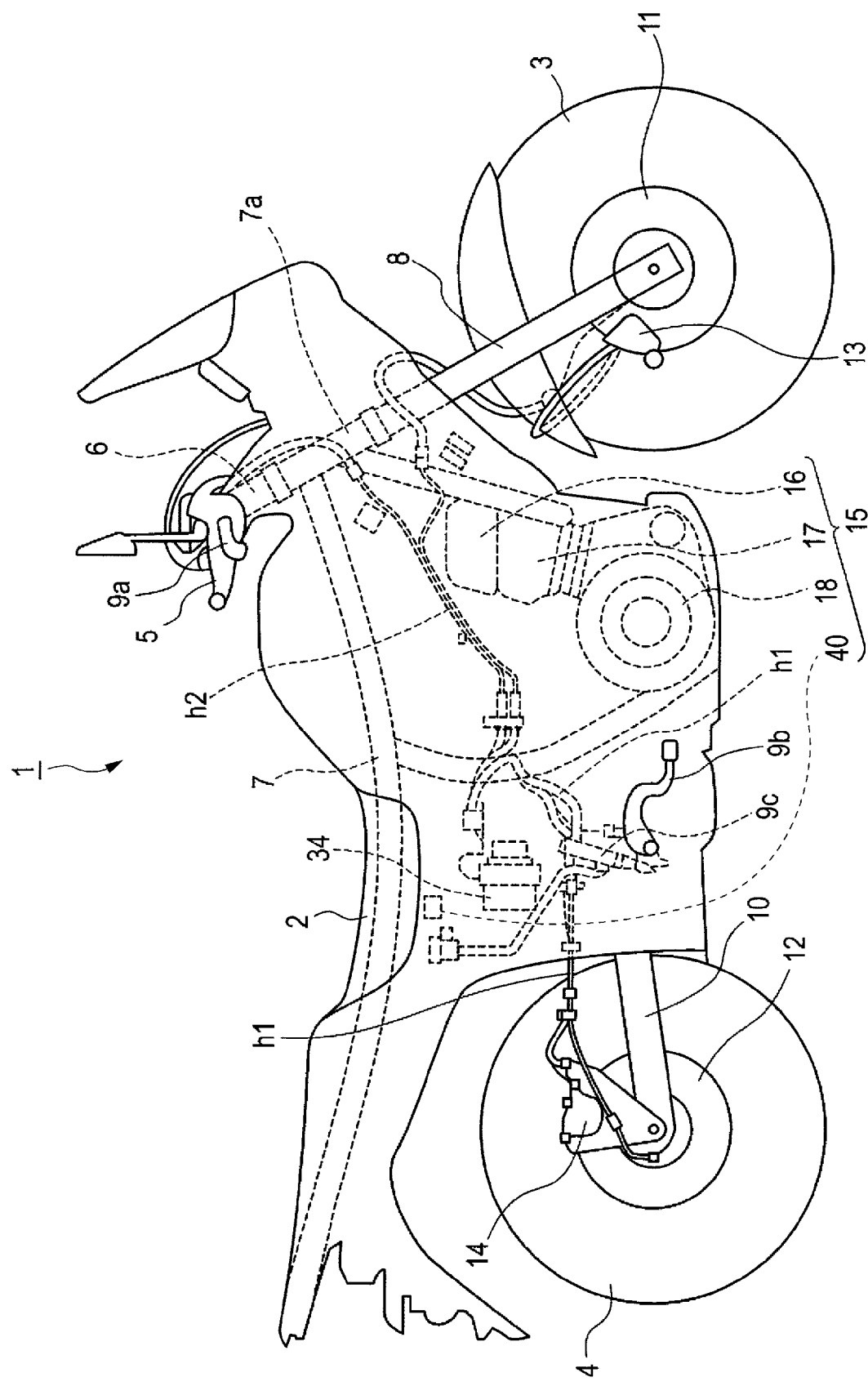
FIG. 1 is a side view showing a riding type vehicle according to an embodiment of the invention.

FIG. 1 is a side view showing a riding type vehicle according to the embodiment.

A riding type vehicle 1 of this embodiment is a vehicle having a riding type seat 2 which a rider straddles to sit thereon. The riding type vehicle 1 includes a body frame 7 having a headstock 7a, a driven wheel 3 as a front wheel, a drive wheel 4 as a rear wheel, a handlebar 5, a steering shaft 6, a driven wheel support unit 8, a driven wheel brake operating device 9a, a drive wheel brake operating device 9b, a swing arm 10, a driven wheel brake disc 11, a drive wheel brake disc 12, a driven wheel brake caliper 13, a drive wheel brake caliper 14, and a drive source unit 15.

The steering shaft 6 is passed through the headstock 7a and turns together with the handlebar 5. The driven wheel support unit 8 supports the driven wheel 3 so as to turn and turns together with the steering shaft 6. With this steering system, when the rider turns the handlebar 5 about the steering shaft 6, the direction of the driven wheel 3 is changed so as to steer the riding type vehicle 1.

The swing arm 10 is supported on the body frame 7 at one end portion thereof so as to swing and supports the drive wheel 4 at the other end portion.

The driven wheel brake operating device 9a is a lever provided on the handlebar 5 so as to be operated by the rider to activate the driven wheel brake caliper 13. The driven wheel brake caliper 13 holds brake pads so as to be displaced by means of, for example, a hydraulic pressure. The brake pads are disposed to face each other across the driven wheel brake disc 11. The driven wheel brake disc 11 rotates together with the driven wheel 3. The brake pads hold the driven wheel brake disc 11 therebetween under high pressure as a result of the rider operating the brake operating device 9a, and the brake pads slide against the driven wheel brake disc 11 to give braking torque to the driven wheel 3.

The drive wheel brake operating device 9b is a pedal which is provided on a foot rest, and the drive wheel brake caliper 14 is activated as a result of the rider operating the pedal. The drive wheel brake caliper 14 holds brake pads so as to be displaced by means of, for example, a hydraulic pressure. The brake pads are disposed so as to face across the drive wheel brake disc 12. The drive wheel brake disc 12 rotates together with the driven wheel 4. The brake pads hold the drive wheel brake disc 12 therebetween under high pressure as a result of the rider operating the brake operating device 9b, and the brake pads slide against the drive wheel brake disc 12 to give braking torque to the drive wheel 4. The drive wheel brake caliper 14, the brake pads and the drive wheel brake disc 12 correspond to an example of a drive wheel brake mechanism.

The drive source unit 15 includes a drive torque control device 40 (which will be described in detail later), a drive source 17 which is configured to generate drive source torque and which is an internal combustion engine, an air inlet passage 19 (refer to FIG. 3) which is configured to supply air to the drive source 17, an air cleaner 16 which is configured to allow the passage of air which is to be supplied into the air inlet passage 19, and a throttle valve 35 (refer to FIG. 3) which is disposed in the air inlet passage 19 and which is configured to change a cross-sectional area of the air inlet passage 19.

Figure 2:
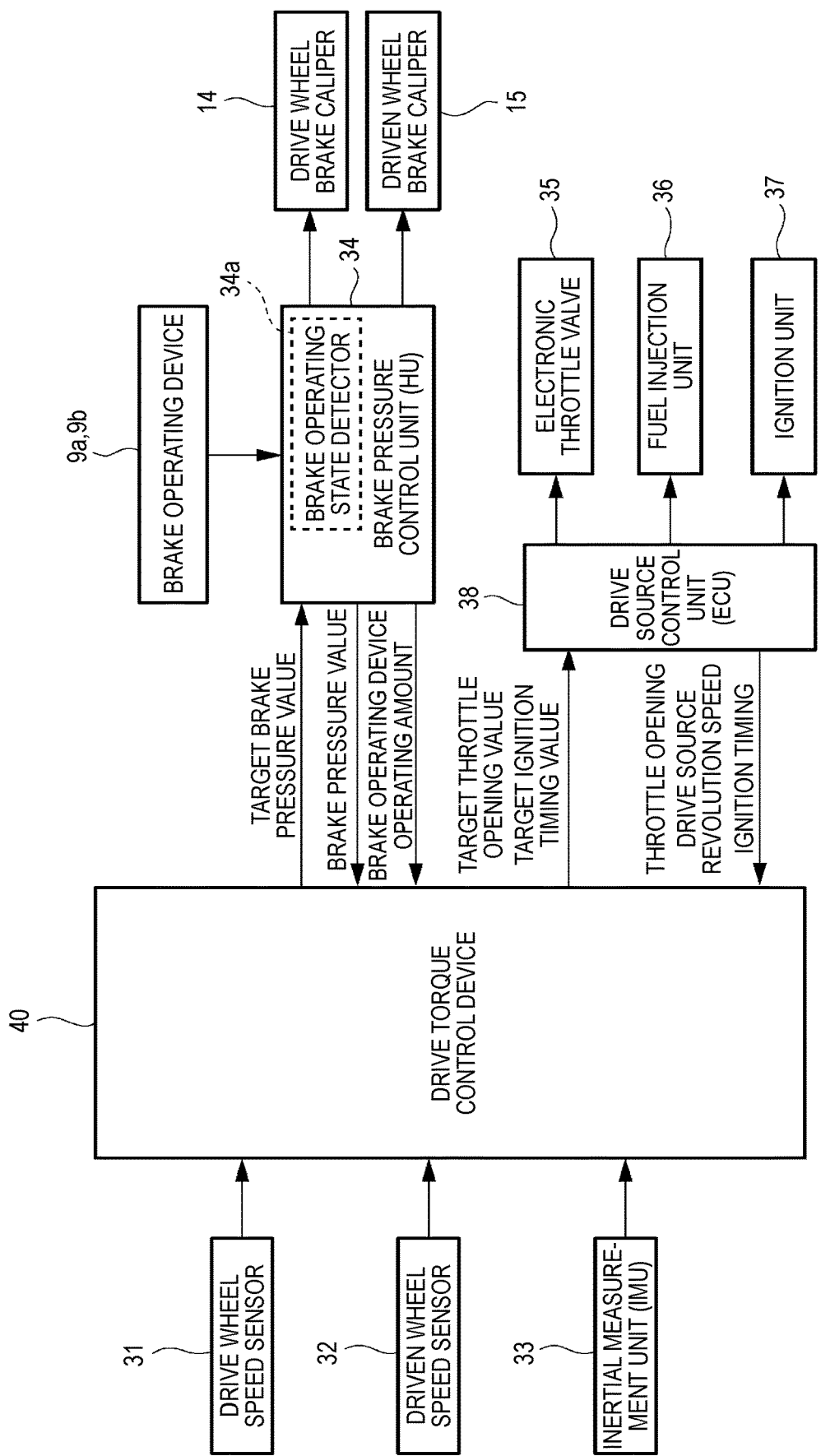
FIG. 2 is a block diagram showing an electronic control system of the riding type vehicle according to the embodiment.

The drive source 17 increases or decreases drive force as a result of an amount of inlet air being controlled by controlling the electronic throttle valve 35 (refer to FIG. 2). The drive force of the drive source 17 is transmitted to the drive wheel 4 via a crankshaft and a transmission unit 18 to give torque to the drive wheel 4. In this way, the drive wheel 4 is rotated by the torque. The torque given to the drive wheel 4 by means of the drive force of the drive source unit 15 will be referred to as drive source torque.

FIG. 2 is a block diagram showing an electronic control system of the riding type vehicle according to the embodiment.

The riding type vehicle 1 of the embodiment includes further a drive wheel speed sensor 31, a driven wheel speed sensor 32, an inertial measurement unit (IMU) 33, the drive torque control device 40, a brake pressure control unit (Hydraulic Unit: HU) 34, the electronic throttle valve 35, a fuel injection unit 36, an ignition unit 37, and a drive source control unit (ECU) 38.

The drive wheel speed sensor 31 detects a rotation speed of the drive wheel 4. The drive wheel speed sensor 31 outputs a drive wheel speed signal which signals a rotation speed to the drive torque control device 40. The drive wheel speed sensor 31 is provided on the swing arm 10. The drive wheel speed sensor 31 may output a drive wheel speed signal to other control units.

The driven wheel speed sensor 32 detects a rotation speed of the driven wheel 3. The driven wheel speed sensor 32 outputs a drive wheel speed signal which indicates a rotation speed to the drive torque control device 40. The driven wheel speed sensor 32 is provided on the driven wheel support unit 8. The driven wheel speed sensor 32 may output a driven wheel speed signal to the other control units.

The riding type vehicle 1 turns to the left or right while causing the body frame 7 to lean in a leftward or rightward direction as viewed from the rider. The inertial measurement unit 33 measures a leaning angle (also, referred to as a bank angle) of the riding type vehicle 1 when it is turning to the left or right and outputs a leaning angle signal which indicates a leaning angle to the drive torque control device 40. The inertial measurement unit 33 may detect the occurrence of a driven wheel skid in which the driven wheel 3 slides in the direction of a rotational shaft and the occurrence of a drive wheel skid in which the drive wheel 4 slides in the direction of a rotational shaft.

The brake pressure control unit 34 controls electrically a hydraulic pressure of the drive wheel brake caliper 14 to thereby control the braking torque of the drive wheel 4. The drive wheel brake caliper 14 is connected to a drive wheel hydraulic piston-cylinder 9c (refer to FIG. 1) which operates in association with the operation of the brake operating device 9b via a drive wheel oil hose h1. The brake pressure control unit 34 is interposed in a halfway position along the length of the drive wheel oil hose h1 and transfers a hydraulic pressure in the drive wheel hydraulic piston-cylinder 9c to the drive wheel brake caliper 14 when not in a controlling operation. However, when in the controlling operation, the brake pressure control unit 34 controls the hydraulic pressure of the drive wheel brake caliper 14 without depending upon the hydraulic pressure of the drive wheel hydraulic piston-cylinder 9c.

The brake pressure control unit 34 further controls electrically the hydraulic pressure of the driven wheel brake caliper 13 to thereby control the braking torque of the driven wheel 3. The driven wheel brake caliper 13 is connected to a driven wheel hydraulic piston-cylinder which operates in association with the operation of the brake operating device 9 via a driven wheel oil hose h2 (refer to FIG. 1). The brake pressure control unit 34 is interposed in a halfway position along the length of the driven wheel oil hose h2 and transfers a hydraulic pressure in the driven wheel hydraulic piston-cylinder to the driven wheel brake caliper 13 when not in the controlling operation. However, when in the controlling operation, the brake pressure control unit 34 controls the hydraulic pressure of the driven wheel brake caliper 13 without depending upon the hydraulic pressure of the driven wheel hydraulic piston-cylinder.

The brake pressure control unit 34 detects a current brake pressure value and outputs the detected brake pressure value to the drive torque control device 40. The brake pressure control unit 34 receives a target brake pressure value from the drive torque control device 40 and controls both the driven wheel brake caliper 13 and the drive wheel brake caliper 14 such that the brake pressure value becomes the target brake pressure value.

The brake pressure control unit 34 includes a brake operating state detector 34a. The brake operating state detector 34a is configured to detect an amount of operation of the driven wheel brake operating device 9a and an amount of operation of the drive wheel brake operating device 9b based on hydraulic pressures in the drive wheel oil hose h1 and the driven wheel oil hose h2. The brake pressure control unit 34 outputs both the detected amount of operation of the driven wheel brake operating device 9a and the detected amount of operation of the drive wheel brake operating device 9b to the drive torque control device 40.

Figure 3:
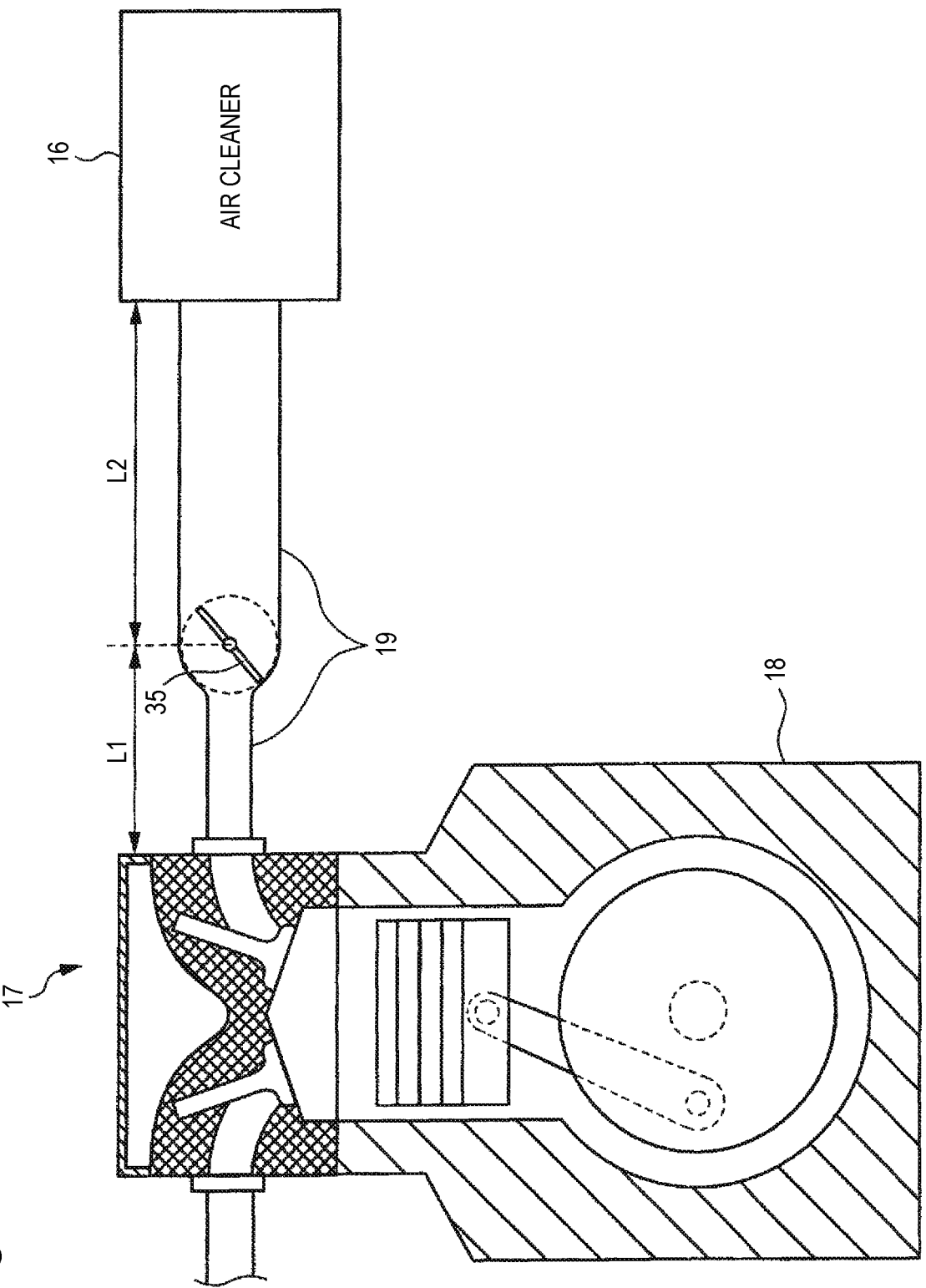
FIG. 3 is a conceptual diagram illustrating a layout of an electronic throttle valve of the riding type vehicle according to the embodiment.

Next, referring to FIG. 3, the electronic throttle valve 35 will be described. FIG. 3 is a conceptual diagram illustrating the layout of the electronic throttle valve 35 of the riding type vehicle according to the embodiment. As shown in FIG. 3, the electronic throttle valve 35 is provided between the air cleaner 16 and the drive source 17 of the drive source unit 15 in the air inlet passage 19 and is configured to be activated to change the opening of the air inlet passage 19 through electric control. In a path length of the air inlet passage 19, a distance L2 from the electronic throttle valve 35 to an end portion of the air inlet passage 19 where the air inlet passage 19 is connected to the air cleaner 16 is longer than a distance L1 from the electronic throttle valve 35 to an end portion of the air inlet passage 19 where the air inlet passage 19 is connected to the drive source 17. In other words, in the path length of the air inlet passage 19, the electronic throttle valve 35 is disposed to be closer to the end portion of the air inlet passage 19 where the air inlet passage 19 is connected to the drive source 17 than the end portion of the air inlet passage 19 where the air inlet passage 19 is connected to the air cleaner 16.

The fuel injection unit 36 is configured to inject fuel into the air inlet passage 19 through electrical control. Fuel so injected is burnt in a cylinder of the drive source 17 to generate drive force.

The ignition unit 37 is fixed to a cylinder head of the drive source 17 and generates a spark in the cylinder of the drive source 17 at a controlled timing. The spark causes the fuel in the cylinder of the drive source 17 to start burning.

The drive source control unit (ECU) 38 is configured to control the electronic throttle valve 35, the fuel injection unit 36 and the ignition unit 37 to thereby control the burning in the drive source 17. The drive source control unit 38 outputs pieces of information on a current throttle position or opening, a current drive source revolution speed, a current ignition timing to the drive torque control device 40. The drive source control unit 38 receives a target throttle opening value from the drive torque control device 40 and controls the electronic throttle valve 35 such that the current throttle opening becomes the target throttle opening value. In addition, the drive source control unit 38 receives a target ignition timing value from the drive torque control device 40 and controls the ignition unit 37 so that the current ignition timing becomes the target ignition timing value. Although an illustration is omitted, the drive source control unit 38 receives a signal which indicates an amount of operation of a throttle operating device (for example, a throttle grip) which is operated by the rider and controls the electronic throttle valve in accordance with the amount of operation of the throttle operating device during a normal riding.

Figure 4:
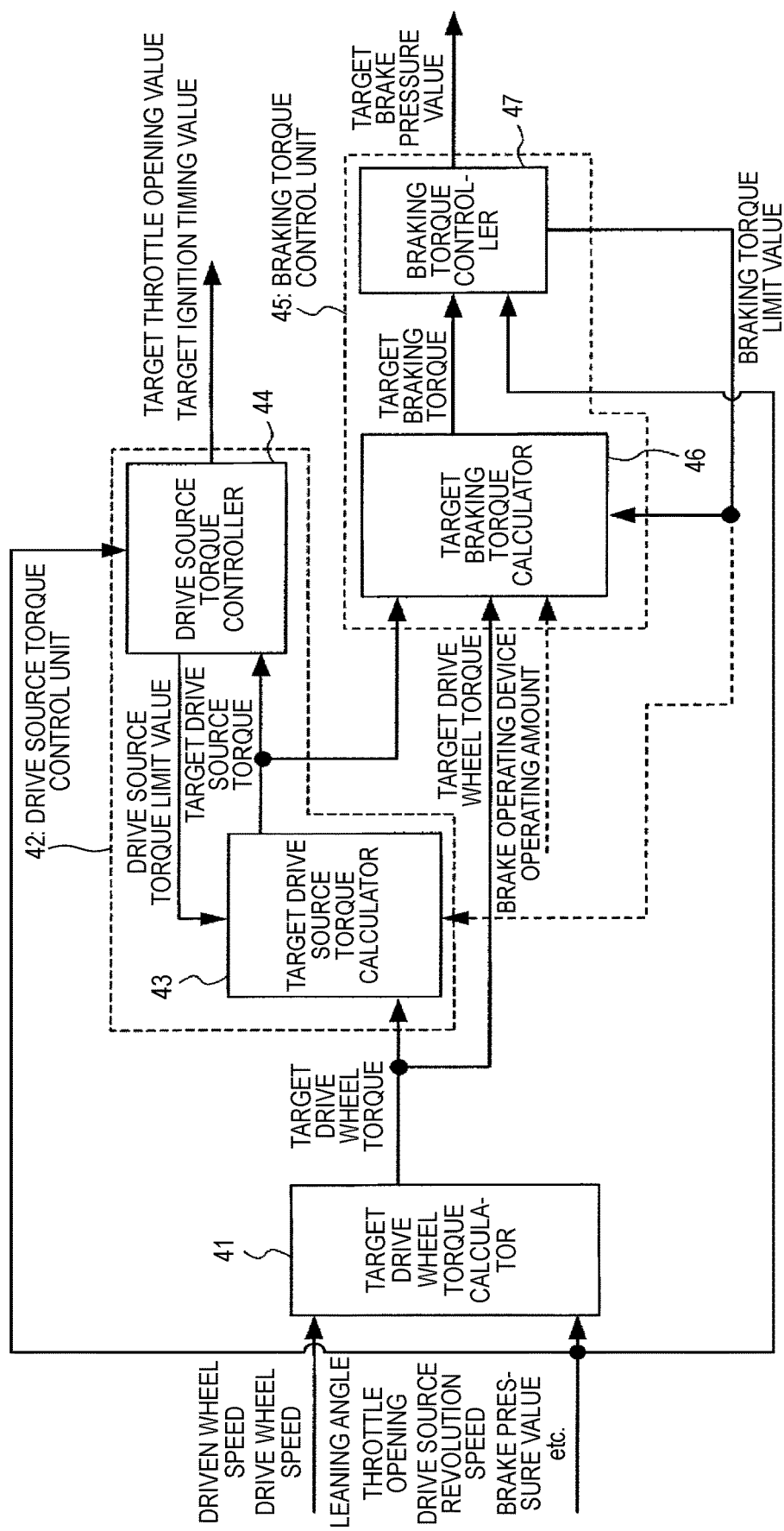
FIG. 4 is a functional block diagram showing a functional configuration of a drive torque control device shown in FIG. 2.

Referring to FIG. 4, the drive torque control device 40 will be described. FIG. 4 shows functional blocks of the drive torque control device 40 shown in FIG. 2. The drive torque control device 40 may be configured by at least one electronic control unit (ECU). The electronic control unit may include at least one microcontroller, which includes one or more processors and one or more memories, and other electronic circuit which includes active elements and passive elements. Also, the electronic control unit may be configured by at least one integrated circuit (IC) such as application specific integrated circuit (ASIC), field-programmable gate array (FPGA) or the like. Further, the electronic control unit may be configured by the combination of at least one microcontroller and at least one integrated circuit. The drive torque control device 40 is configured to control the drive wheel torque in accordance with running states separately from the control through the operation of the related device by the rider while the riding type vehicle 1 is being ridden normally. The control of the drive wheel torque in accordance with running states includes a traction control which eliminates quickly a slip when the drive wheel 4 slips when starting from the rest. Further, the control of the drive wheel torque in accordance with running states may include, for example, a control to suppress an overshoot in cornering or a posture control of the riding type vehicle 1. The drive wheel torque is torque generated in the drive wheel 4 and represents an amount of propelling force of the drive wheel 4 relative to a road surface which is expressed by moment about a rotational shaft of the drive wheel 4. Specifically, the drive wheel torque is torque obtained by the addition of drive source torque which is generated by power transferred from the drive source 17 and braking torque which is generated by the operation of the drive wheel brake caliper 14.

The drive torque control device 40 includes a target drive wheel torque calculator 41, a drive source torque control unit 42, and a braking torque control unit 45. The drive source torque control unit 42 has a target drive source torque calculator 43 and a drive source torque controller 44. The braking torque control unit 45 has a target braking torque calculator 46 and a braking torque controller 47.

The target drive wheel torque calculator 41 calculates a target drive wheel torque for the drive wheel 4 from a piece of information indicating a current running state. The target drive wheel torque calculator 41 receives, as the piece of information indicating current running state, pieces of information on a driven wheel speed, a drive wheel speed, a leaning angle, a throttle opening, a drive source revolution speed and a brake pressure value. Here, the target drive wheel torque denotes a target value of drive wheel torque. The target drive wheel torque varies every control cycle.

As an example, in the case of a traction control, the target drive wheel torque calculator 41 determines that the drive wheel 4 is slipping from pieces of information on a driven wheel speed and a drive wheel speed in the event that the drive wheel speed is faster than the driven wheel speed. As this occurs, the target drive wheel torque calculator 41 calculates a target drive wheel torque as a value which is greater than zero but is very small. The slipping state of the drive wheel 4 is eliminated as a result of the drive wheel torque becoming very small, and as a result of the drive wheel torque being maintained at the value which is greater than zero, the drive wheel 4 is allowed to hold the propelling force which is exhibited after the slippage of the drive wheel 4 is eliminated.

A target drive wheel torque calculating method adopted by the target drive wheel torque calculator 41 may be modified variously depending upon ways of controlling the riding type vehicle 1 which can be in various running states.

The drive source torque control unit 42 calculates a target drive source torque and controls the drive source torque based on the target drive source torque. The drive source torque means torque which is transferred to the drive wheel 4 and which is generated by means of the drive force of the drive source 17. A target value of the drive source torque will be referred to as target drive source torque.

When receiving a target drive wheel torque and a drive source torque limit value, the target drive source torque calculator 43 calculates a target drive source torque based on the target drive wheel torque and the drive source torque limit value and outputs the calculated target drive source torque to the drive source torque controller 44 and the braking torque control unit 45.

The target drive source torque is a target value of drive source torque which will be generated in a predetermined period of time from now. For example, the target drive source torque takes a value which is almost the same as that of drive source torque which will be generated one control cycle later from the start of a control. The timing at which the drive source torque reaches the target value is not limited to the one control cycle. For example, the drive source torque may reach the target value a plurality of cycles of control later, in a predetermined period of time, in a period of time which varies with a predetermined function or in a period of time which varies under a predetermined condition.

The drive source torque limit value is at least one of a maximum value (an upper limit value) and a minimum value (a lower limit value) of drive source torque which can be generated in a predetermined period of time from now. The drive source torque limit value is determined by the drive source torque controller 44, and a method of determination will be described later.

Hereinafter, a method of calculating a target drive source torque will be described.

Firstly, as an example, a case will be described where the drive source torque is decreased. In this case, the target drive source torque calculator 43 calculates a target drive source torque by limiting the target drive wheel torque calculated at the target drive wheel torque calculator 41 by the lower limit value of the drive source torque received from the drive source torque controller 44.

Figure 5:
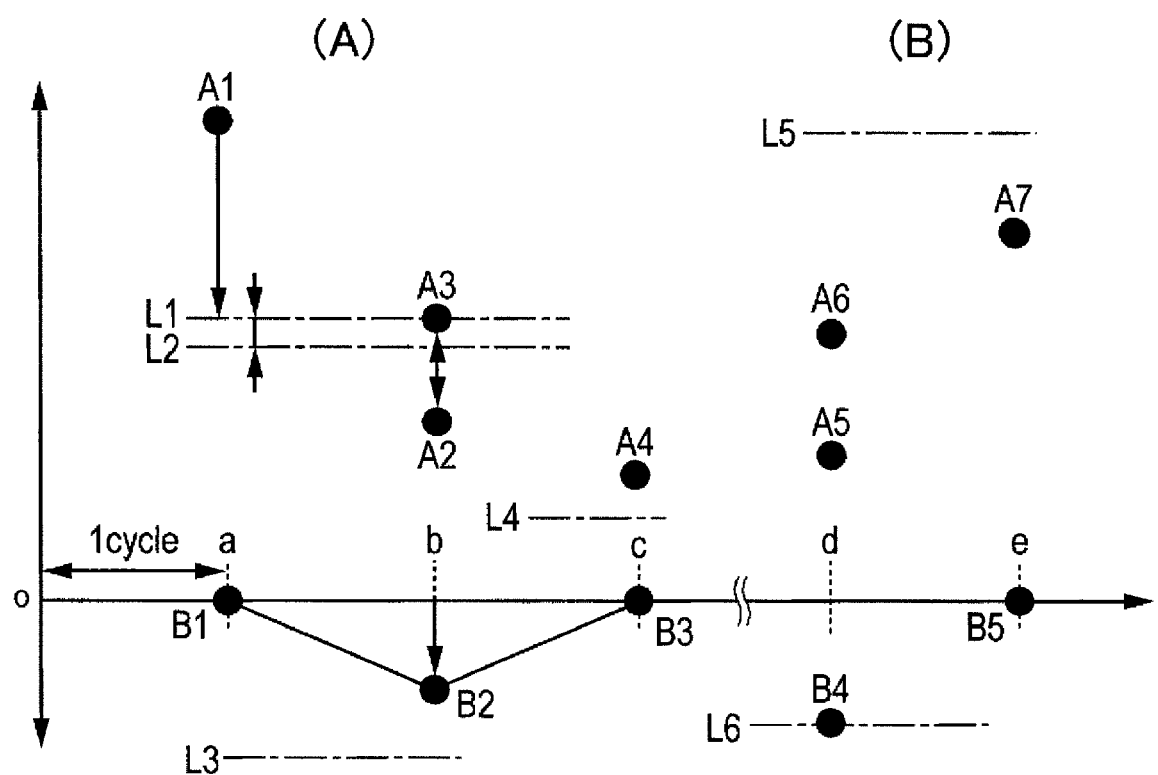
FIG. 5 shows diagrams illustrating examples of target drive wheel torque, target drive source torque and target braking torque shown in FIG. 4.

Here, referring to FIG. 5A, an example of a method of calculation of a target drive source torque will be described which is adopted when the drive source torque is decreased. In FIG. 5A, an axis of abscissa denotes control cycle, and an axis of ordinate denotes target drive wheel torque and target drive source torque.

For example, assume that target drive wheel torque and target drive source torque are A1 at a point in time "a" when a predetermined control cycle starts. Then, assume that after the point in time "a," the target drive source torque calculator 43 receives a target drive wheel torque A2 and also receives a lower limit value L1 of the drive source torque. In this case, since the target drive wheel torque A2 is smaller than the lower limit value L 1, the target drive source torque calculator 43 determines on a target drive source torque whose value is the same as the lower limit value. Namely, a target drive source torque A3 is determined. Then, the target drive source torque calculator 43 outputs the target drive source torque A3 to the drive source torque controller 44 and the target braking torque calculator 46.

Further, assume that after a point in time "b," the target drive source torque calculator 43 receives a target drive wheel torque A4 and a lower limit value L4 of the drive source torque. In this case, since the target drive wheel torque A4 is greater than the lower limit L4, the target drive source torque calculator 43 determines on a target drive source torque whose value is the same as that of the target drive wheel torque A4. Namely, a target drive source torque A4 is determined. Then, the target drive source torque calculator 43 outputs the target drive source torque A4 to the drive source torque controller 44 and the target braking torque calculator 46.

Next, as another example, a case will be described where the drive source torque is increased. In this case, the target drive source torque calculator 43 calculates a target drive source torque by limiting the target drive wheel torque calculated at the target drive wheel torque calculator 41 by the upper value of the drive source torque received from the drive source torque controller 44.

Here, referring to FIG. 5B, an example of a method of calculation of a target drive source torque will be described which is adopted when the drive source torque is increased. In FIG. 5B, an axis of abscissa denotes control cycle, and an axis of ordinate denotes target drive wheel torque and target drive source torque.

For example, assume that target drive wheel torque is A5, and target drive source torque is A6 at a point in time "d" when a predetermined control cycle starts. Then, assume that after the point in time "d," the target drive source torque calculator 43 receives a target drive wheel torque A7 and an upper limit value L5 of the drive source torque. In this case, since the target drive wheel torque A7 is smaller than the upper limit value L5, the target drive source torque calculator 43 determines on a target drive source torque whose value is the same as the target drive wheel torque A7. Namely, a target drive source torque A7 is determined. Then, the target drive source torque calculator 43 outputs the target drive source torque A7 to the drive source torque controller 44 and the target braking torque calculator 46.

Thus, the methods of calculation of target drive source torque have been described.

The drive source torque controller 44 outputs a target throttle opening value and a target ignition timing value to the drive source control unit 38 based on the target drive source torque received from the target drive source torque calculator 43.

In addition, the drive source torque controller 44 estimates a drive source torque limit value (for example, at least one of an upper limit and a lower limit) based on the current revolution speed of the drive source 17, throttle opening and ignition timing and outputs the drive source limit value so estimated to the target drive source torque calculator 43. For example, the drive source torque controller 44 estimates a drive source torque limit value from a data table in which at least the revolution speed of the drive source 17 and the throttle opening are associated with the upper limit value and the lower limit value of the drive source torque.

In this embodiment, while the drive source torque controller 44 is described as the drive source torque limit value outputting both the upper limit and the lower limit of the drive source torque to the target drive source torque calculator 43, the drive source torque controller 44 may output either of the upper limit and the lower limit of the drive source torque. For example, in the event that the drive source torque controller 44 executes the control to decrease the current drive source torque, the drive source torque controller 44 may output the lower limit of the drive source torque to the target drive source torque calculator 43. In addition, for example, in the event that the drive source torque controller 44 executes the control to increase the current drive source torque, the drive source torque controller 44 may output the upper limit of the drive source torque to the target drive source torque calculator 43.

In the description of this embodiment, while the drive source torque controller 44 determines the drive source torque limit value and outputs the drive source limit value so determined to the target drive source torque calculator 43, the target drive source torque calculator 43 may determine the drive source torque limit value. For example, the drive source torque controller 44 may output at least the current revolution speed of the drive source 17 and throttle opening to the target drive source torque calculator 43, and the target drive source torque calculator 43 may determine the upper value or the lower value of the drive source from a data table in which at least the revolution speed of the drive source 17 and the throttle opening are associated with the upper value and the lower value of the drive source torque. The target drive source torque calculator 43 calculates a target drive source torque by limiting the target drive wheel torque by the drive source torque limit value determined by the target drive source torque calculator 43 itself.

In the description of this embodiment, while the drive source torque limit value is estimated based on at least the current revolution speed and throttle opening, the drive source torque controller 44 or the target drive source torque calculator 43 may estimate the drive source torque limit value by using a drive source model or a drive system model. The drive source model and the drive system model are made up of, for example, a function on which a drive torque of the drive source 17 is calculated from the throttle opening, the revolution speed of the drive source 17 and the ignition timing and a function on which the current drive source torque is estimated by multiplying the drive torque of the drive source 17 by the reduction gear ratio of the transmission unit 18. The functions may be replaced with a data table.

The braking torque control unit 45 controls the braking toque by calculating a target braking torque and controlling the brake pressure control unit 34 based on the target braking torque. Specifically, the braking torque is the braking torque of the drive wheel 4. A target value of the braking torque will be referred to as a target braking torque.

The target braking torque calculator 46 receives the target drive wheel torque, the target drive source torque and a braking torque limit value, calculates a target braking torque based on those and outputs the calculated target braking torque to the braking torque controller 47.

The target braking torque is a target braking torque which will be generated in a predetermined period of time from now.

In addition, the braking torque limit value is at least one of a maximum value (an upper limit value) and a minimum value (a lower limit value) of a braking torque which can be generated in a predetermined period of time from now.

Hereinafter, a method of calculating a target braking torque will be described.

Firstly, a method of calculating a target braking torque adopted when the drive source torque controller 44 decreases the drive source torque will be described with reference to FIG. 5A.

For example, assume that a target drive wheel torque and a target drive source torque which are inputted into the target braking torque calculator 46 at a point in time "a" when a predetermined control cycle starts are A1. As this occurs, in the event that a value resulting from subtracting the target drive wheel torque from the target drive source torque is equal to or smaller than a predetermined value, the target braking torque calculator 46 determines that the target braking torque should be zero. Namely, a target braking torque B1 is determined. The target braking torque calculator 46 outputs the target braking torque B1 to the braking torque controller 47.

For example, assume that a target drive wheel torque and a target drive source torque which are inputted into the target braking torque calculator 46 at a point in time "b" when a predetermined control cycle starts are A2 and A3, respectively. As this occurs, in the event that a value obtained by subtracting the target drive wheel torque from the target drive source torque is not equal to or smaller than a predetermined value, the target braking torque calculator 46 determines that the target braking torque is the difference between the target drive source torque A3 and the target drive wheel torque A2. Namely, a target braking torque B2 is determined. The target braking torque calculator 46 outputs the target braking torque B2 to the braking torque controller 47. In FIG. 5A, the case is described where the target braking torque B2 is smaller than a braking torque limit value L3. However, for example, in the event that the determined target braking torque is greater than the braking torque limit value L3, the target braking toque calculator 46 determines a target braking torque whose value is the same as the braking torque limit value L3. In this way, the target braking torque is determined so as not to exceed the braking torque limit value.

For example, assume that a target drive wheel torque and a target drive source torque which are inputted into the target braking torque calculator 46 at a point in time "c" when a predetermined cycle starts are A4. As this occurs, since no difference exists between the target drive wheel torque and the target drive source torque, the target braking torque calculator 46 determines that the target braking torque should be zero. Namely, a target braking torque B3 is determined. The target braking torque calculator 46 outputs the target braking torque B3 to the braking torque controller 47.

Even in the event that a value obtained by subtracting the target drive wheel torque inputted into the target braking torque calculator 46 from the target drive source torque inputted into the same calculator is not equal to or smaller than a predetermined value, in case the difference is within a predetermined value (for example, in case the difference is within a difference between a lower limit value L1 and a brake threshold L2 as shown in FIG. 5A), the target braking torque calculator 46 may determine that the target braking torque should be zero. The brake threshold L2 may be a fixed value or may be a value based on a physical quantity such as drive wheel torque or the opening of the electronic throttle valve 35.

Next, as another example, a method of calculating a target braking torque adopted when the drive source torque controller 44 decreases the drive source torque will be described below with reference to FIG. 5B.

For example, assume that a target drive wheel torque and a target drive source torque which are inputted into the target braking torque calculator 46 at a point in time "d" when a predetermined control cycle starts are A5 and A6, respectively. As this occurs, in the event that a value obtained by subtracting the target drive wheel torque from the target drive source torque is not equal to or smaller than a predetermined value, the target braking torque calculator 46 determines that the target braking torque is the difference between the target drive source torque A6 and the target drive wheel torque A5. Namely, a target braking torque B4 is determined. In the event that the target braking torque B4 is greater than a braking torque limit value L6, the target braking toque B4 is determined to be a value which is the same as the braking torque limit value L6. The target braking torque calculator 46 outputs the target braking torque B4 to the braking torque controller 47.

For example, assume that a target drive wheel torque and a target drive source torque which are inputted into the target braking torque calculator 46 at a point in time "e" when a predetermined control cycle starts are both A7. As this occurs, in the event that a value obtained by subtracting the target drive wheel torque from the target drive source torque is equal to or smaller than a predetermined value, the target braking torque calculator 46 determines that the target braking torque should be zero. Namely, a target braking torque B5 is determined. The target braking torque calculator 46 outputs the target braking torque B5 to the braking torque controller 47.

Thus, the methods of calculation of a target braking torque have been described.

Figure 6:
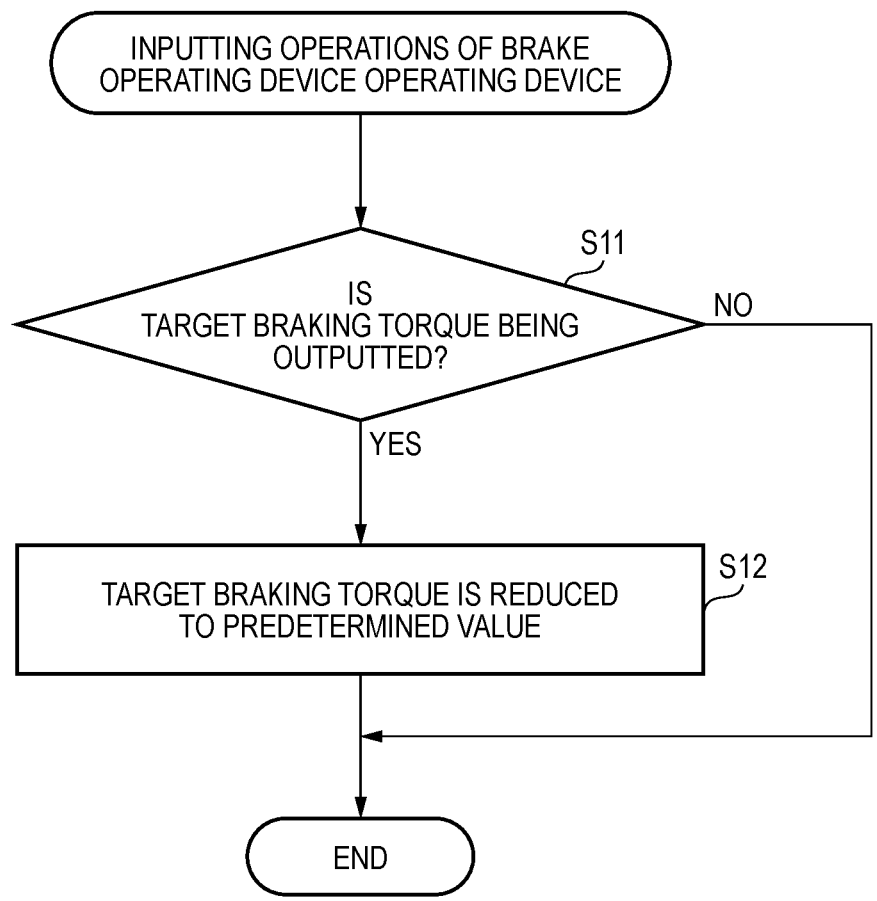
FIG. 6 is a flow chart showing operations which are executed in response to a signal which signals an amount of operation of a brake operating device inputted into a target braking torque calculator shown in FIG. 4.

When receiving an amount of operation of the brake operating device 9*b*, the target braking torque calculator 46 may perform operations as shown in FIG. 6. When receiving an amount of operation of the brake operating device 9*b*, the target braking torque calculator 46 confirms whether or not a target braking torque is being outputted (step S11). If no target braking torque is being outputted (NO in step S11), the target braking torque calculator 46 ends the operation. On the other hand, if a target braking torque is being outputted (YES in step S11), the target braking torque calculator 46 decreases the target braking torque to a predetermined value (step S12) and ends the operation. For example, in step S12, the target braking torque calculator 46 sets the target braking torque such that a target braking torque calculated based on the amount of operation of the brake operating device 9*b*, the target drive wheel torque and the target drive source torque becomes smaller than a total value of a target braking torque calculated based on the target drive wheel torque and the target drive source torque and a required braking torque corresponding to the amount of operation of the brake operating device. By doing so, even when the braking torque of the drive wheel 4 is being controlled by the drive torque control device 40, in the event that the rider operates the brake operating device 9*b*, the operation by the rider takes priority over the control by the drive torque control device 40, whereby the braking torque corresponding to the operation of the brake operating device by the rider works. Namely, it is possible to realize the smooth drive wheel torque control which takes the amount of operation of the brake operating device 9*b* which is operated by the rider into consideration.

The braking torque controller 47 outputs a target brake pressure value to the brake pressure control unit 34 based on the target braking torque which the braking torque controller 47 has received from the target braking torque calculator 46. The braking torque is proportional to the hydraulic pressure of the drive wheel brake caliper 14. The braking torque controller 47 calculates a target brake pressure value which corresponds to the target braking torque and outputs the calculated target brake pressure value.

The braking torque controller 47 estimates a braking torque limit value (for example, at least one of an upper limit value and a lower limit value of the braking torque) based on the current brake pressure value and outputs the estimated braking torque limit value to the target braking torque calculator 46. For example, the braking torque controller 47 estimates a braking torque limit value from a data table in which at least the brake pressure value is associated in advance with the upper limit value of the braking torque and outputs the estimated braking torque limit value to the target braking torque calculator 46.

The braking torque limit value is used to calculate the target braking torque as described above. In addition, the braking torque limit value may be inputted into the target drive source torque calculator 43 to calculate a target drive source torque. In this case, since the target drive source torque calculator 43 can calculate a target drive source torque by referring further to the drive torque limit value, it is possible to realize the highly responsive and smooth drive torque control in response to a change in behavior of the vehicle.

In the description of this embodiment, while the braking torque limit value is estimated based on at least the brake pressure value, the braking torque controller 47 may estimate a braking torque limit value using a brake model. The brake model is made up of, for example, a function on which a braking torque is calculated from the brake pressure value. The function may be replaced with a data table.

Figure 7:
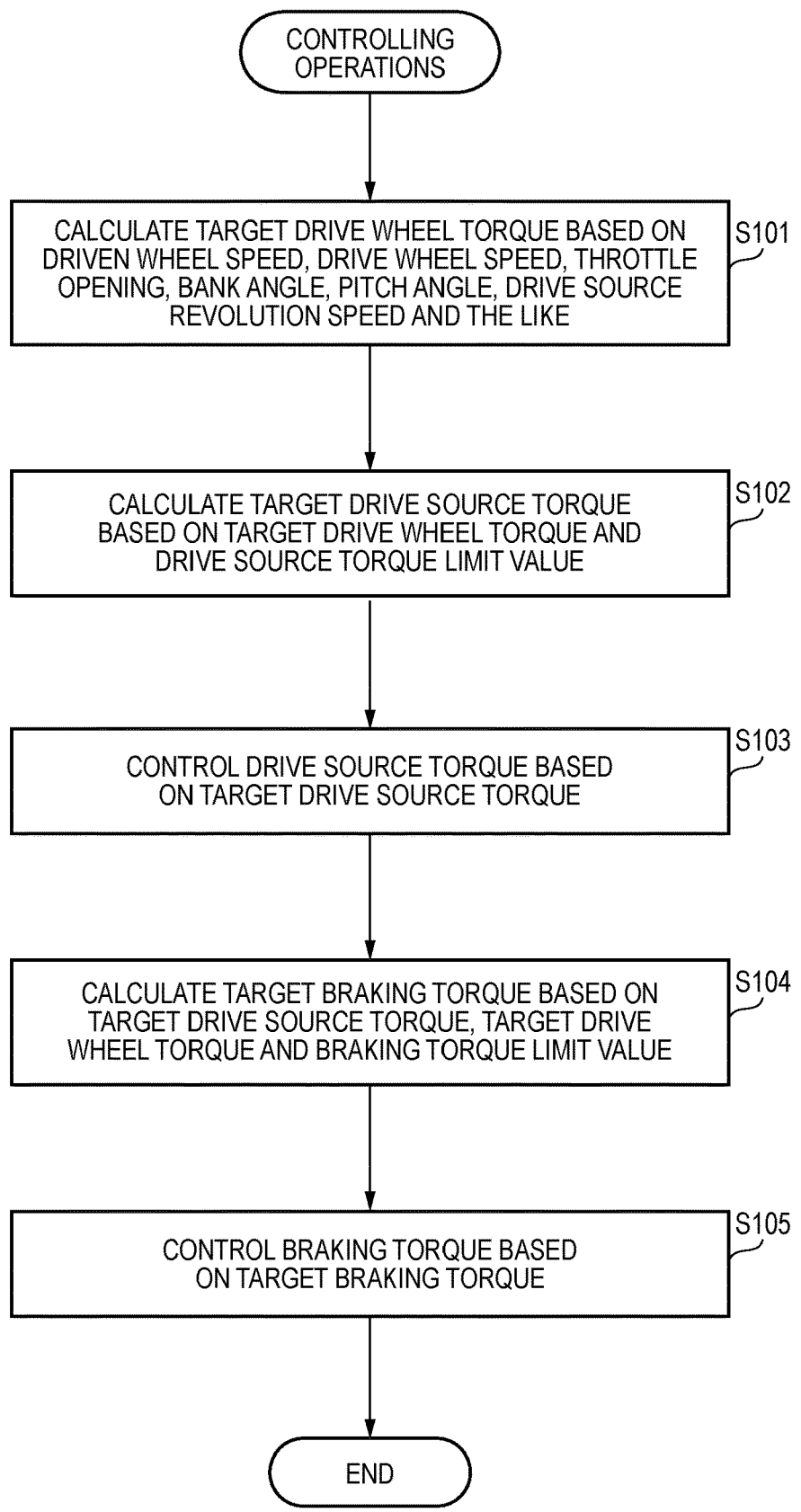
FIG. 7 is a flow chart showing operations of a drive torque control device shown in FIG. 4.

Next, referring to FIG. 7, controlling operations which the drive source torque control system 40 executes will be described. FIG. 7 is a flow chart showing controlling operations of the drive source torque control system 40.

The target drive wheel torque calculator 41 calculates a target drive wheel torque based on driven wheel speed, drive wheel speed, throttle opening, bank angle, pitch angle, drive source revolution speed and the like (step S101).

The target drive source torque calculator 43 calculates a target drive source torque based on the target drive wheel torque received from the target drive wheel torque calculator 41 and the drive source torque limit value received from the drive source torque controller 44 (step S102).

The drive source torque controller 44 controls the drive source torque based on the target drive source torque received from the target drive source torque calculator 43 (step S103).

The target braking torque calculator 46 calculates a target braking torque based on the target drive wheel torque received from the target drive wheel torque calculator 41, the target drive source torque received from the target drive source torque calculator 43 and the braking torque limit value received from the braking torque controller 47 (step S104).

The braking torque controller 47 controls the braking torque based on the target braking torque received from the target braking torque calculator 46 (step S105).

<Description of Function>

Next, the function of a traction control which constitutes an example of the drive torque control of the riding type vehicle 1 will be described.

When the drive wheel 4 slips while the riding type vehicle 1 is running, the drive wheel speed becomes faster than the driven wheel speed. The drive torque control device 40 detects the slip of the drive wheel 4 by comparing the driven wheel speed with the drive wheel speed. Specifically, the target drive wheel torque calculator 41 of the drive torque control device 40 detects the slip of the drive wheel 4, calculates a target drive wheel torque which eliminates the slip of the drive wheel 4, and outputs the calculated target drive wheel torque to the drive source torque control unit 42 and the braking torque control unit 45.

The target drive source torque calculator 43 of the drive source torque control unit 42 calculates a target drive source torque based on the target drive wheel torque and the drive source torque limit value. Next, the drive source torque controller 44 of the drive source torque control unit 42 a target throttle opening value and a target ignition timing value to the drive source control unit 38 based on the target drive source torque.

The drive source control unit (ECU) 38 changes the throttle opening and the ignition timing based on the target throttle opening value and the target ignition timing value. By doing so, the target throttle opening value and the target ignition timing value are realized in the next control cycle.

When receiving the target drive wheel torque, the target drive source torque and the braking torque limit value (further, the amount of operation of the brake operating device may be inputted), the target braking torque calculator 46 of the braking torque control unit 45 calculates a target braking torque from those received. Next, the braking torque controller 47 of the braking torque control unit 45 outputs a target brake pressure value to the brake pressure control unit (HU) 34 based on the target braking torque. The brake pressure control unit 34 controls the hydraulic pressure of the driven wheel brake caliper 13 and the hydraulic pressure of the drive wheel brake caliper 14 based on the target brake pressure value to thereby control the braking torque of the drive wheel 4 and the braking torque of the driven wheel 3. The brake pressure control unit 34 may control only the braking torque of the drive wheel 4 by controlling the hydraulic pressure of the drive wheel brake caliper 14 based on the target brake pressure value. In addition, the brake pressure control unit 34 may control only the braking torque of the driven wheel 3 by controlling the hydraulic pressure of the driven wheel brake caliper 13 based on the target brake pressure value.

The braking torque control unit 45 performs the highly responsive braking torque control in an auxiliary fashion while the drive source torque control unit 42 performs positively the control of the drive source torque. In this way, it is possible to change the torque of the drive wheel 4 to the target drive wheel torque quickly.

Advantageous Effects of the Embodiment

Thus, as described above, according to the drive torque control device 40 of this embodiment, the drive source torque control unit 42 estimates at least one of the maximum value and the minimum value of the drive source torque which can be generated in the predetermined period of time from the present time as the drive source torque limit value, calculates the target value of the drive source torque which is to be generated in the predetermined period of time from the present time as the target drive source torque based on the target drive wheel torque and the drive source torque limit value and controls the drive source torque based on the target drive source torque. The braking torque control unit 45 estimates at least one of the maximum value and the minimum value of the braking torque which is to be generated in the predetermined period of time from now or the present time as the braking torque limit value, calculates as the target braking torque which is the target value of the braking torque which is to be generated in the predetermined period of time from the present time based on the target drive wheel torque, the target drive source torque and the braking torque limit value and controls the braking torque based on the target braking torque. Namely, according to the drive torque control device 40 of this embodiment, it is possible to realize the highly responsive and smooth drive torque control (for example, the traction control or the like) in response to a change in behavior of the vehicle while enhancing the energy efficiency thereof by making use of both the drive source torque and the braking torque.

In the event that the braking torque is used mainly, a great quantity of heat is generated by the application of the brakes, resulting in such problems as an increase in consumed power of the brake pressure control unit 34 and the wear of the brake pads. However, the occurrence of these problems is reduced by, firstly, making positive use of the drive source torque to thereby obtain advantageous effect that the brake mechanism (the drive wheel brake caliper 14, the brake pads, a drive wheel brake disc 12, the brake pressure control unit 34) can be protected. Thus, according to the embodiment, it is possible to provide the drive torque control device 40 which can realize the more highly responsive and smoother drive torque control in response to a change in behavior of the vehicle while enhancing the energy efficiency thereof and suppressing the wear of the brake mechanism.

According to the drive torque control device 40 of the embodiment, in the event that the value obtained by subtracting the drive wheel torque from the target drive source torque is equal to or smaller than the predetermined value, the braking torque control unit sets the target braking torque to zero. Thus, since the drive source torque is actively used, it is possible to enhance the energy efficiency thereof.

According to the drive torque control device 40 of the embodiment, the brake operating state detector 34a detects the amount of operation of the brake operating device 9b which is disposed on the vehicle and outputs the signal which indicates the amount of operation of the brake operating device 9b to the target braking torque calculator 46. In addition, the target braking torque calculator 46 may set the target braking torque such that the target braking torque which is calculated based on the amount of operation of the brake operating device 9b, the target drive wheel torque and the target drive source torque is smaller than the total value of the target braking torque which is calculated based on the target drive wheel torque and the target drive source torque and the required braking torque which corresponds to the amount of operation of the brake operating device 9b. In this way, it is possible to realize the smooth drive torque control which takes the amount of operation of the brake operating device 9b which is operated by the rider into consideration.

According to the drive source torque control system 40 of the embodiment, the electronic throttle valve 35 is disposed in the position which is closer to the end portion of the air inlet passage 19 which is connected to the drive source 17 than the end portion of the air inlet passage 19 which is connected to the air cleaner 16. Therefore, since the drive source torque control unit 42 changes the drive source torque by changing the cross-sectional area of the air inlet passage 19 by driving the electronic throttle valve 35, it is possible to enhance the responsiveness with respect to a change in drive source torque. This allows the drive source torque control unit 42 to be actively used. Thus, it is possible to provide the drive source unit which can realize the highly responsive and smooth drive torque control in response to a change in behavior of the vehicle while enhancing the energy efficiency thereof by making use of both the drive source torque and the braking torque.

The vehicle 1 includes the drive torque control device 40, the drive source 17 configured to generate drive source torque, the drive wheel 4 configured to be rotated by means of the drive source torque, and the brake mechanism configured to apply braking torque to the drive wheel 4 (the drive wheel brake caliper 14, the driven wheel brake caliper 13 and the like). In this way, it is possible to provide the vehicle 1 which can realize the highly responsive and smooth drive torque control (for example, the traction control or the like) in response to a change in behavior of the vehicle while enhancing the energy efficiency thereof by making use of both the drive source torque and the braking torque.

Thus, the embodiment has been described.

In the embodiment, the drive wheel of the vehicle is described as being the rear wheel. The braking torque which is controlled by the braking torque control unit 45 is described as being the braking torque generated in the drive wheel 4. However, the other wheel such as the front wheel (for example, the driven wheel 3) may be used as the drive wheel of the vehicle of the invention. In the case of the driven wheel 3 being used as the drive wheel, the braking torque which is controlled by the braking torque control unit 45 is a braking torque which is generated in the driven wheel 3.

In the embodiment, the drive source 17 which is the internal combustion engine is described as being the drive source. However, the drive source of the invention should be a drive source such as an electric motor, for example, which applies driving force to the drive wheel.

Drive source torque generated in a predetermined number of cycles such as two control cycles or three control cycles from the start of a control by the drive source torque control unit 42 or drive source torque generated in a predetermined period of time may be used as the target drive source torque of the invention.

In this embodiment, the brake operating devices are described as being the lever type brake operating device and the pedal type brake operating device. However, the brake operating devices may take any form, provided that the rider can operate them to apply the brakes, and hence, a switch type brake operating device may be adopted as the brake operating devices.

In the embodiment, the vehicle 1 is described as being the riding type two-wheeled vehicle. However, the vehicle 1 may be any vehicle having a drive wheel. For example, the vehicle 1 may be a four-wheeled vehicle. Further, the vehicle 1 may be any vehicle having a seat on which a rider sits while straddling it. Thus, the vehicle 1 may be a motorcycle, a scooter type two-wheeled vehicle, a tricycle having a left front wheel and a right front wheel, an all terrain vehicle (ATV), a snowmobile or the like.

The invention can be carried out in many different forms. This disclosure should be regarded as providing the principle embodiment of the invention. Many examples are described herein based on the understanding that the embodiment is not intended to limit the invention to the preferred examples described and/or illustrated herein.

Some exemplary embodiments of the invention are described herein. The invention is not limited to the various types of preferred exemplary embodiments described herein. The invention encompasses every embodiment including equivalent elements, modifications, deletions, combinations (for example, a combination of characteristics common among various examples), improvements and/or alterations that can be recognized based on this disclosure by those skilled in the art to which the invention pertains. Limitative matters in patent claims should be construed widely based on terms used in the patent claims. The invention should not be limited to the embodiment described in this specification or embodiments described in prosecution of this patent application. Those embodiments should be construed as non-exclusive. For example, in the description of the embodiment, terms such as "preferable" or "good" are non-exclusive and mean "although preferable, not limited thereto" or "although good, not limited thereto."

This patent application is based on Japanese Patent Application (No. 2015-037182) filed on Feb. 26, 2015, the contents of which are incorporated herein by reference.

DESCRIPTION OF REFERENCE NUMERALS 1 vehicle
2 riding type seat
3 driven wheel
4 drive wheel
5 handlebar
9b drive wheel brake operating device
12 drive wheel brake disc
14 drive wheel brake caliper
15 drive source unit
16 air cleaner
17 drive source
18 transmission unit
31 drive wheel speed sensor
32 driven wheel speed sensor
33 inertial measurement unit
34 brake pressure control unit
35 electronic throttle valve
36 fuel injection unit
37 ignition unit
38 drive source control unit
40 drive torque control device
41 target drive wheel torque calculator
42 drive source torque control unit
43 target drive source torque calculator
44 drive source torque controller
45 braking torque control unit
46 target braking torque calculator
47 braking torque controller

The invention claimed is:

1. A drive torque control device of a vehicle that includes a drive source for generating a drive source torque, a brake mechanism for generating a braking torque, and a drive wheel for driving the vehicle, the drive torque control device comprising:
a target drive wheel torque calculator configured to calculate a target drive wheel torque for driving the drive wheel;
a drive source torque control unit configured to
estimate a drive source torque limit value based on a revolution speed of the drive source and a throttle opening, the drive source torque limit value including a maximum value and a minimum value of the drive source torque that is generatable by the drive source in a predetermined period of time from a current time,
calculate a target drive source torque, which is a target value of the drive source torque to be generated in the predetermined period of time from the current time, based on the target drive wheel torque and the estimated drive source torque limit value, including upon determining that the maximum value in the estimated drive source torque limit value is smaller than the target drive wheel torque and that the minimum value in the estimated drive source torque limit value is larger than the target drive wheel torque, limiting the target drive wheel torque calculated at the target drive wheel torque calculator by the maximum value and the minimum value, respectively, and
control the generation of the drive source torque by the drive source based on the target drive source torque; and
a braking torque control unit configured to
calculate a target braking torque, which is a target value of the braking torque to be generated by the brake mechanism in the predetermined period of time from the current time, based on the target drive wheel torque and the target drive source torque, and
control the generation of the braking torque by the brake mechanism based on the target braking torque.

2. The drive torque control device according to claim 1, wherein the braking torque control unit is configured to
estimate a braking torque limit value, which includes at least one of a maximum value and a minimum value of the braking torque that is generatable by the brake mechanism in the predetermined period of time from the current time, and
calculate the target braking torque based on the target drive wheel torque, the target drive source torque and the braking torque limit value.

3. The drive torque control device according to claim 2, wherein
the drive source torque control unit comprises:
a drive source torque controller configured to control the generation of the drive source torque based on the target drive source torque and to estimate the drive source torque limit value; and
a target drive source torque calculator configured to calculate the target drive source torque based on the target drive wheel torque and the drive source torque limit value; and
the braking torque control unit comprises:
a braking torque controller configured to control the generation of the braking torque based on the target braking torque and to estimate the braking torque limit value; and
a target braking torque calculator configured to calculate the target braking torque based on the target drive wheel torque, the target drive source torque and the braking torque limit value.

4. The drive torque control device according to claim 3, wherein
the vehicle further includes a brake operating device; and
the target braking torque calculator calculates the target braking torque further based on an amount of operation of the brake operating device.

5. The drive torque control device according to claim 4, wherein
the target braking torque calculator sets the target braking torque such that the target braking torque, which is calculated based on an amount of operation of the brake operating device, the target drive wheel torque and the target drive source torque, is smaller than a total value of the target braking torque, which is calculated based on the target drive wheel torque and the target drive source torque, and a required braking torque which corresponds to an amount of operation of the brake operating device.

6. The drive torque control device according to claim 3, wherein the drive source torque controller
determines the drive source torque limit value based on the revolution speed of the drive source and the throttle opening; and
outputs the drive source torque limit to the target drive source torque calculator.

7. The drive torque control device according to claim 2, wherein upon determining that a difference between the target drive wheel torque and the target drive source torque is equal to or smaller than a predetermined value, the braking torque control unit sets the target braking torque to zero.

8. A drive source unit of a vehicle that includes a brake mechanism for generating a braking torque, and
a drive wheel for driving the vehicle,
the drive source unit comprising:
a drive source for generating a drive source torque,
   a drive torque control device that includes
   a target drive wheel torque calculator configured to calculate a target drive wheel torque for driving the drive wheel;
   a drive source torque control unit configured to
   estimate a drive source torque limit value based on a revolution speed of the drive source and a throttle opening, the drive source torque limit value including a maximum value and a minimum value of the drive source torque that is generatable by the drive source in a predetermined period of time from a current time,
   calculate a target drive source torque, which is a target value of the drive source torque to be generated in the predetermined period of time from the current time, based on the target drive wheel torque and the estimated drive source torque limit value, including
upon determining that the maximum value in the estimated drive source torque limit value is smaller than the target drive wheel torque and that the minimum value in the estimated drive source torque limit value is larger than the target drive wheel torque, limiting the target drive wheel torque calculated at the target drive wheel torque calculator by the maximum value and the minimum value, respectively, and
   control the generation of the drive source torque by the drive source based on the target drive source torque; and
   a braking torque control unit configured to
   calculate a target braking torque, which is a target value of the braking torque to be generated by the brake mechanism in the predetermined period of time from the current time, based on the target drive wheel torque and the target drive source torque, and
   control the generation of the braking torque by the brake mechanism based on the target braking torque;
   an air inlet passage configured to supply air to the drive source;
   a throttle valve disposed in the air inlet passage and configured to change a cross-sectional area of the air inlet passage; and
   an air cleaner configured to allow passage of air into the air inlet passage.

9. The drive source unit according to claim 8, comprising further:

a throttle valve drive unit configured to change the cross-sectional area of the air inlet passage by driving the throttle valve, wherein
the drive source torque control unit is configured to control driving of the throttle valve drive unit.

10. The drive source unit according to claim 9, wherein the air inlet passage has a first end portion and a second end portion that are respectively connected to the drive source and the air cleaner; and
the throttle valve is disposed in a position that is closer to the first end portion of the air inlet passage than the second end portion.

11. A vehicle, comprising:

a drive source configured to generate a drive source torque;
a drive wheel configured to be driven by the drive source;
a brake mechanism configured to apply braking torque to the drive wheel; and
a drive torque control device including
   a target drive wheel torque calculator configured to calculate a target drive wheel torque for driving the drive wheel;
   a drive source torque control unit configured to
   estimate a drive source torque limit value based on a revolution speed of the drive source and a throttle opening, the drive source torque limit value including a maximum value and a minimum value of the drive source torque that is generatable by the drive source in a predetermined period of time from a current time,
   calculate a target drive source torque, which is a target value of the drive source torque to be generated in the predetermined period of time from the current time, based on the target drive wheel torque and the estimated drive source torque limit value, including
upon determining that the maximum value in the estimated drive source torque limit value is smaller than the target drive wheel torque and that the minimum value in the estimated drive source torque limit value is larger than the target drive wheel torque, limiting the target drive wheel torque calculated at the target drive wheel torque calculator by the maximum value and the minimum value, respectively, and
   control the generation of the drive source torque by the drive source based on the target drive source torque; and
   a braking torque control unit configured to
   calculate a target braking torque, which is a target value of the braking torque to be generated by the brake mechanism in the predetermined period of time from the current time, based on the target drive wheel torque and the target drive source torque, and
   control the generation of the braking torque by the brake mechanism based on the target braking torque.

12. The vehicle according to claim 11, further comprising a riding type seat.

* * * * *